United States Patent Office 3,517,625
Patented June 30, 1970

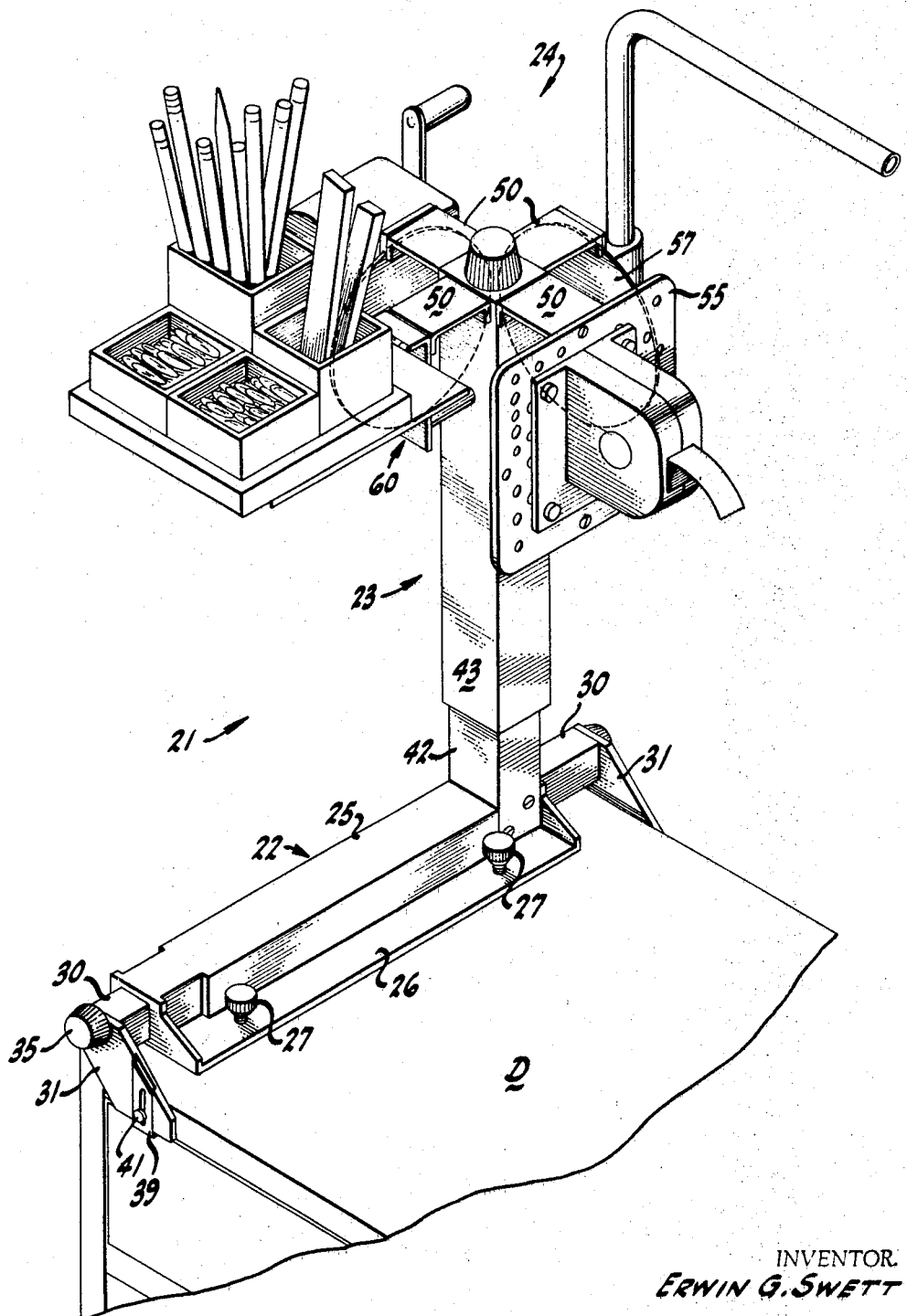

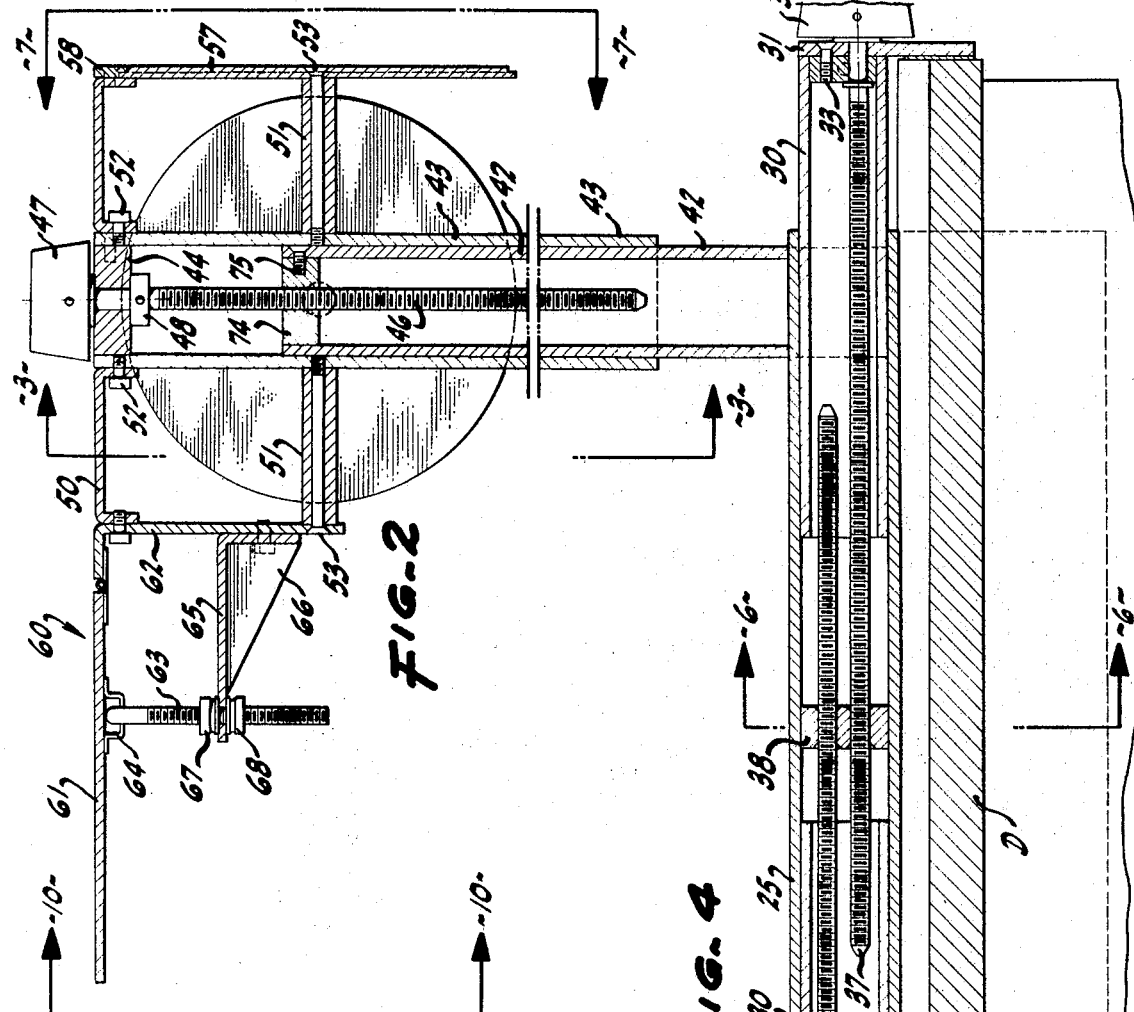
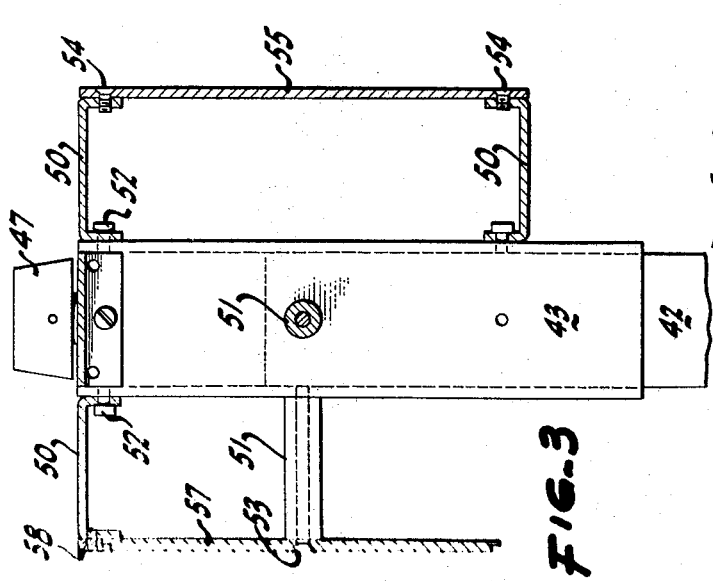
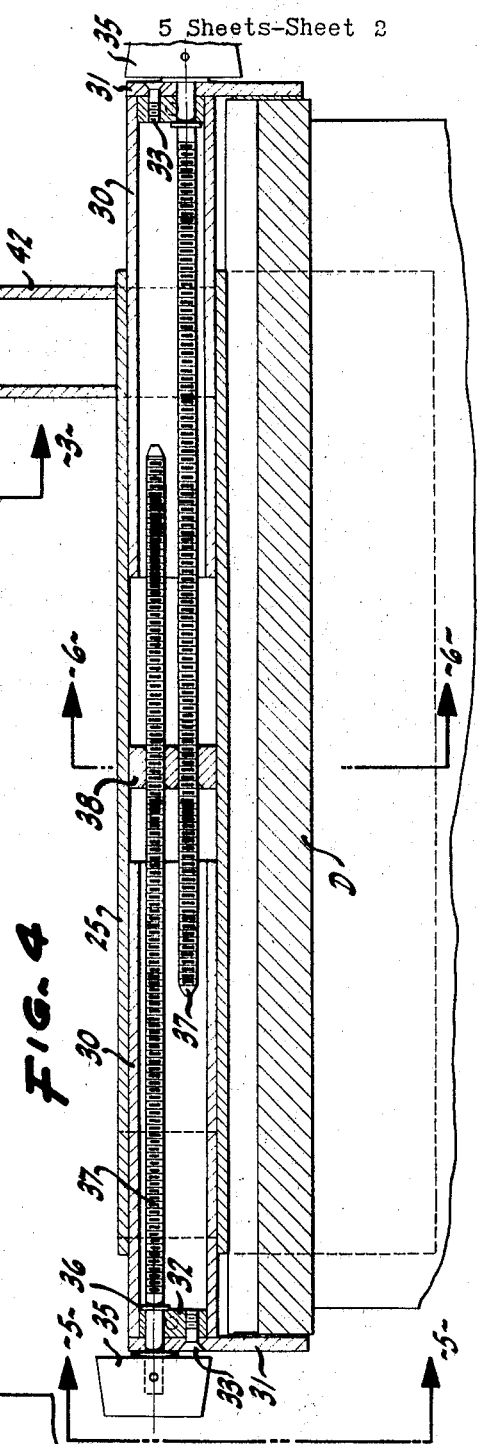

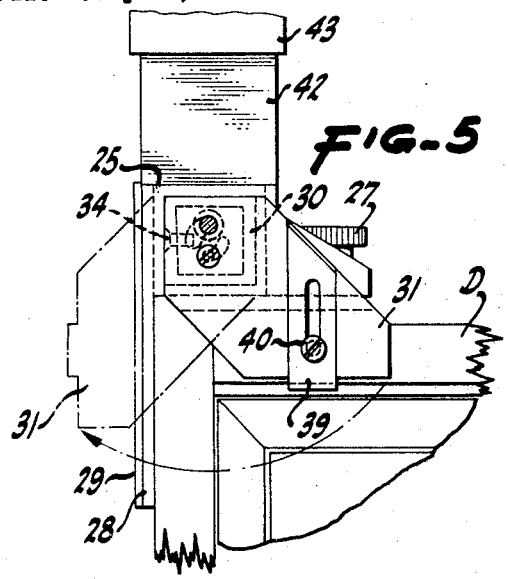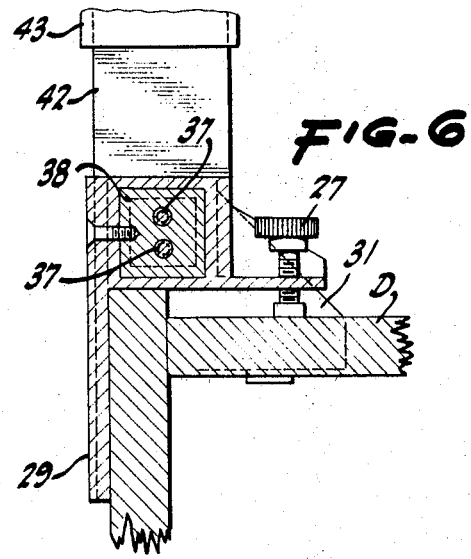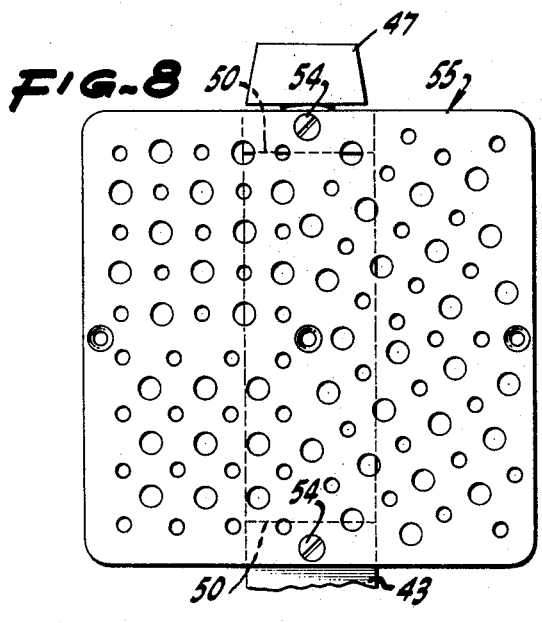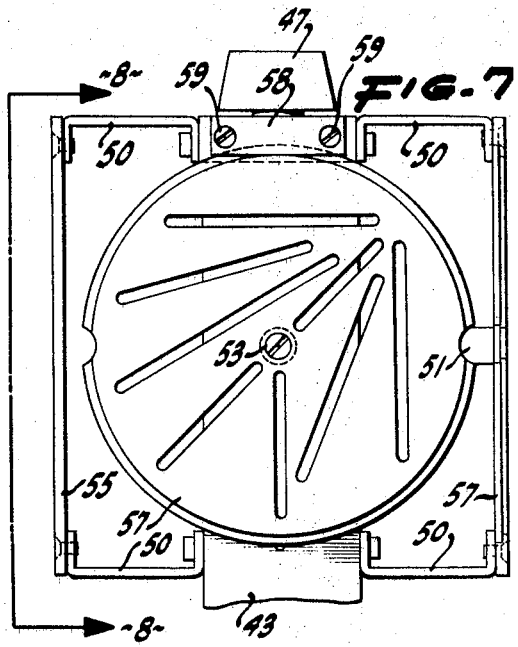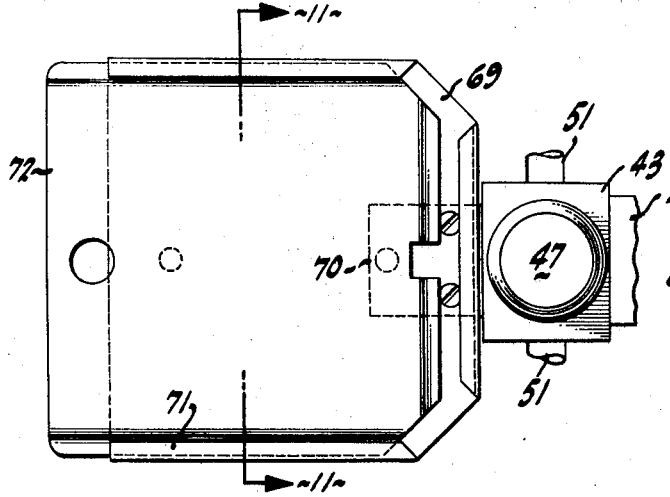

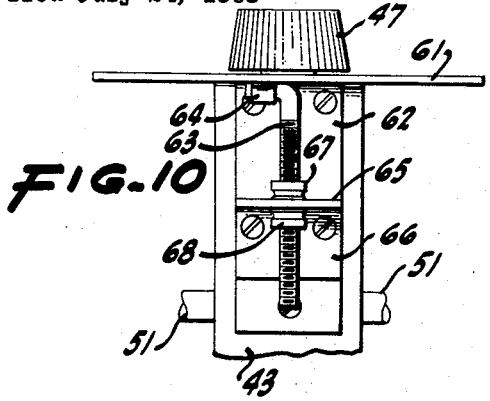
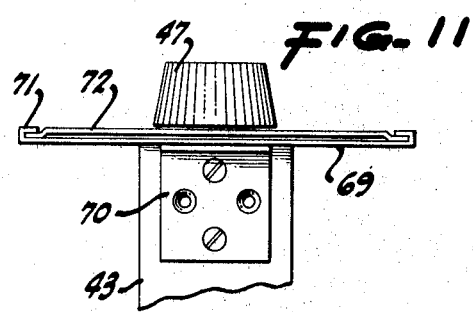
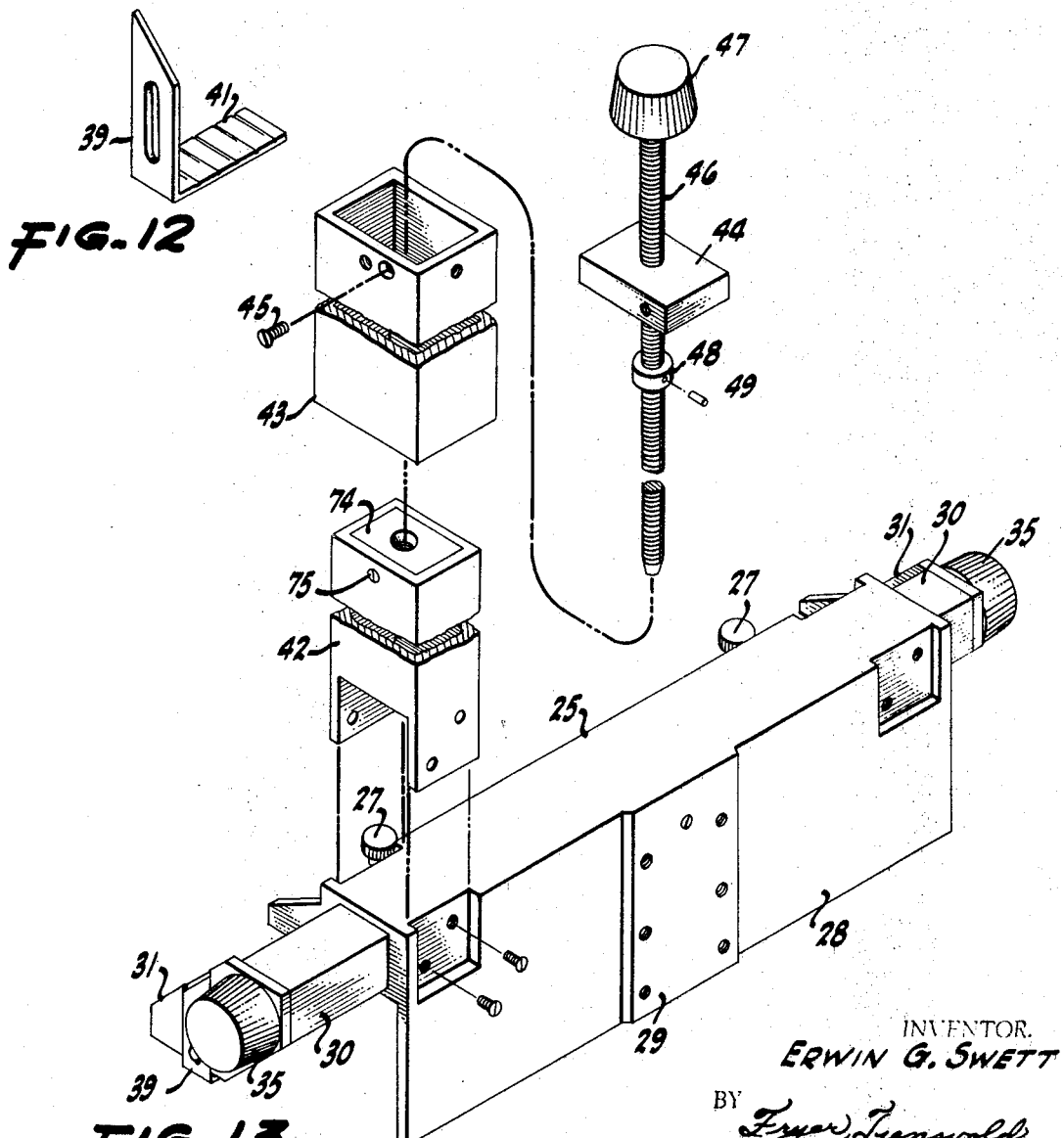

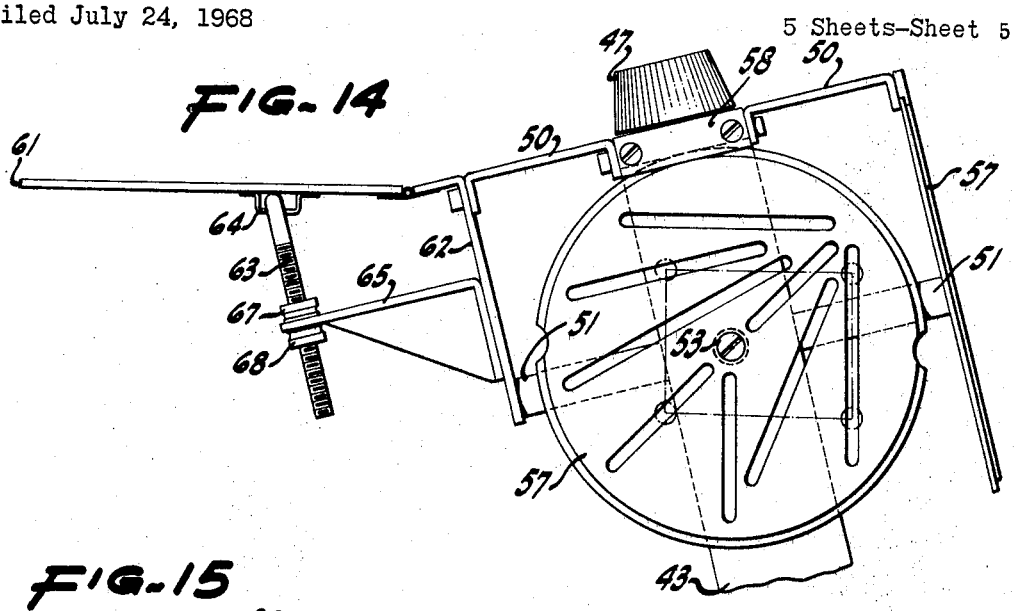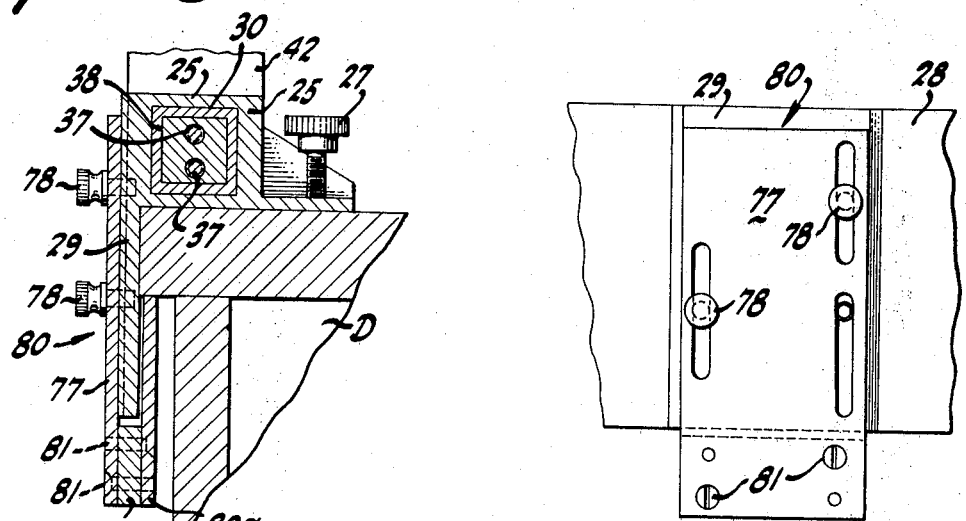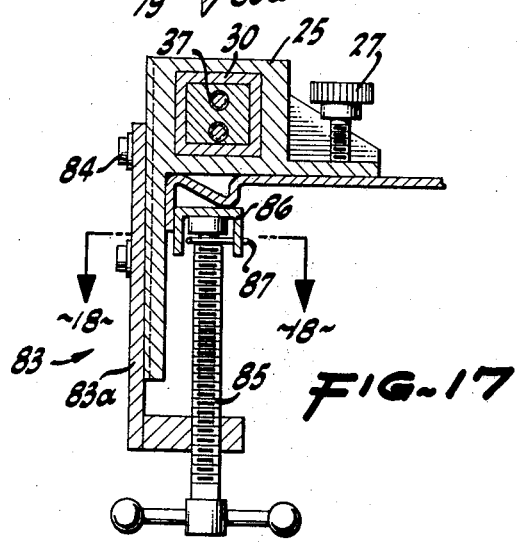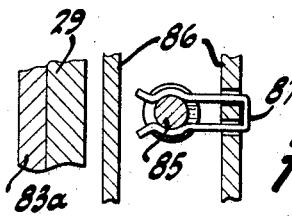

3,517,625
EXTENSIBLE MOUNTING ASSEMBLY WITH MEANS TO GRIP DESK
Erwin G. Swett, 462 22nd Ave., Apt. 6,
San Francisco, Calif. 94121
Filed July 24, 1968, Ser. No. 747,172
Int. Cl. A47f 5/06
U.S. Cl. 108—144                              13 Claims

ABSTRACT OF THE DISCLOSURE

A mounting assembly holds objects in desired positions near a working surface such as a top of a desk or stand without interfering with or reducing the size of such working surface. The mounting assembly includes an adjustable desk gripper which will not mar or otherwise damage the furniture, and mounting brackets which are capable of both accommodating objects having various mounting facilities and holding them at any desired angle.

BRIEF SUMMARY OF THE INVENTION

This invention relates to a mounting assembly for retaining objects at a desired height and angle above a working surface. It is particularly well suited for holding drafting articles above a drafting table, or office articles above a desk. Often draftsmen and office workers make frequent use of small tools, appliances or other objects in the course of their work. For ease of use and to limit interruptions in the work process, it is necessary that such objects be within arm's reach of the worker. Accordingly, they are usually placed on the desk, stand or bench where the work is being done. This has the disadvantage of reducing the usable space available in which to perform the work. In addition, it often interferes with the function of other appliances, such as the travel of a typewriter carriage or the movement of a drafting machine.

In many instances, it is necessary that the objects employed be securely fastened to a frame of reference for proper operation. A mechanical pencil sharpener and an extensible lighting fixture require this type of attachment.

In other cases, such attachment is preferred to allow one-handed operation of objects that would otherwise require the use of both hands, such as a tape dispenser.

In still other cases, such attachment is desirable to prevent objects from being knocked off the desk on which they are placed.

Common methods of attachment are the use of screws or glue for securing objects to a desk. This is unsatisfactory where the attachment is to be temporary, since it permanently damages the surface and finish of the desk.

Clamping devices are available which will avoid permanent injury to the desk, but they interfere with sliding of leaves and drawers, or with the placement of the desk adjacent walls or other furnishings.

Another disadvantage of present attachment methods is the requirement of hand tools for use in fastening the objects to the desk or to brackets attached to the desk.

The mounting assembly of the present invention avoids these disadvantages. It includes a desk gripper which provides attachment of the mounting assembly to the desk without damaging or marring it. Thus, the attachment can be either temporary or permanent.

The desk gripper of the present invention is completely adjustable to accommodate any size or shape of desk desired.

Also, no tools, brackets or other fastening devices are required to attach the desk gripper to the desk.

Another feature of the present invention is that the desk gripper does not affect the utility of the desk by substantially reducing the available working area, or by interfering with other functions of the desk, such as the sliding of drawers.

Still another feature of this invention is the clearance provided by the extensible mounting post so that the operation of other devices such as office machines is not interfered with.

A further feature of this invention is the provision of mounting brackets which can accommodate a plurality of objects without regard to the orientation of any mounting holes with which they may be equipped.

Another feature of the present invention is that such objects may be attached to the mounting brackets without using any tools.

Another feature of this invention is that the height of the mounting bracket can be adjusted for maximum convenience nad ease of operation of the object attached thereto.

Still another feature of this invention is the provision of mounting brackets which may be adjusted at any angle to compensate for any tilting of the desk top.

Other and further features of the present invention will be apparent from the following description and claims, and are illustrated in the accompanying drawings which show preferred embodiments of the present invention.

BRIEF DESCRIPTION OF THE DRAWINGS

In the drawings:

FIG. 1 is a perspective view of a mounting assembly constructed in accordance with one embodiment of the present invention, with various items attached to the mounting brackets;

FIG. 2 is a sectional side elevational view of the extensible mounting post with two mounting brackets attached thereto;

FIG. 3 is a side elevational view of the extensible mounting post with another type of mounting bracket attached on the right thereto, taken along the line and in the direction indicated by the arrows 3—3 in FIG. 2;

FIG. 4 is a side elevational view in section of the desk gripper;

FIG. 5 is a fragmentary end elevational view of the desk gripper taken along the line and in the direction of the arrows 5—5 in FIG. 4;

FIG. 6 is a sectional end elevational view of the desk gripper taken along the lines and in the direction indicated by the arrows 6—6 in FIG. 4;

FIG. 7 is an end elevational view of the extensible mounting post with attached mounting brackets taken along the line and in the direction indicated by arrows 7—7 in FIG. 2;

FIG. 8 is a side elevational view of the extensible mounting post with attached mounting brackets taken along the line and in the direction indicated by the arrows 8—8 in FIG. 7;

FIG. 9 is a top plan view of the extensible mounting post, with a mounting bracket assembly attached thereto;

FIG. 10 is an end elevational view of the mounting bracket assembly shown in FIG. 2 taken along the line and in the direction indicated by the arrows 10—10 in FIG. 2;

FIG. 11 is an end elevational view of the mounting bracket assembly shown in FIG. 9 taken along the line and in the direction indicated by the arrows 11—11;

FIG. 12 is a perspective view of the end bracket 39 shown in FIG. 1;

FIG. 13 is an exploded perspective view of the extensible mounting post attached to the desk gripper;

FIG. 14 is an end elevational view of the extensible mounting post shown inclined from the vertical;

FIG. 15 is a sectional end elevational view of the structure shown in FIG. 6 with an auxiliary clamp attached to the back of the desk gripper;

FIG. 16 is a side elevational view of the clamp shown in FIG. 15;

FIG. 17 is an end elevational view of a clamp attached to the back of the desk gripper for use with an irregular undersurface; and FIG. 18 is a top plan sectional view of the clamp attachment shown in FIG. 17 taken along the line and in the direction indicated by the arrows 18—18.

DETAILED DESCRIPTION OF THE INVENTION

In FIG. 1 a mounting assembly constructed in accordance with one embodiment of the present invention is indicated generally by the reference numeral 21.

The mounting assembly includes a desk gripper 22, an extensible mounting post 23, and mounting bracket assemblies 24.

The desk gripper is shown as it might be employed, attached to a desk D, with various objects attached to the mounting brackets. The desk gripper 22 comprises a horizontal member 25 from which extend telescoping arms 30 with rotational clamps 31 secured to the ledge of the desk D by adjustable brackets 39.

The extensible mounting post 23 includes an upright member 42 attached to horizontal member 25, and telescopically mounting a post 43 to which mounting brackets 55, 57 and 60 are attached by means of supporting brackets 50.

The horizontal member 25 includes a leg 26, which engages the top surface of the desk and has two thumb screws 27 for adjustment for irregularity of the desk top surface. As shown in FIG. 13, a second leg 28, including a mounting plate 29 extends downward at right angles to leg 25 and engages the end of the desk D. The undersurfaces of legs 26 and 28 which engage the desk D are covered with a resilient material to prevent scratching or marring of the desk finish. Leg 28 prevents linear motion of horizontal member 25 in a direction perpendicular to its length.

Two arm members 30 in FIG. 13 extend telescopically from either end of the horizontal member 25. As seen in FIG. 4, an end piece 31 is secured by screw 33 to block 32 which in turn is secured to arm member 30 by screw 34, shown in FIG. 5, and is disposed between knob 35 and collar 36, both attached to a threaded shaft 37 which extends through end piece 31 of arm member 30, and is in threaded engagement with internal block 38 secured to member 25 at its mid-point. Rotation of knob 35 thus affects extension and retraction of telescoping arm member 30 from horizontal member 25 to adjust for the width of the desk D. The end pieces 31 prevent linear motion of member 25 along its longitudinal axis, and rotation of horizontal member 25 about a vertical axis. An adjustable end bracket 39 shown in FIG. 1 is attached to end piece 31 by means of a screw 40 and includes lip 41 shown in FIG. 12 which is scored to be broken off at the desired length. Lip 41 extends under the edge of the desk D and prevents rotation of the horizontal member 25 about a horizontal axis perpendicular to its length; and in cooperation with legs 26 and 28, prevents rotation of horizontal member 25 about its longitudinal axis. Lip 41 also prevents linear motion of the horizontal member 22 in a vertical direction. Thus, horizontal member 22 is completely restrained from any motion relative to the desk D.

As shown in FIG. 13, an upright member 42 is secured to horizontal member 25 and has a block 74 secured in its upper end by screw 75. Mounting post 43 telescopically mounts over upright member 42 and has a block 44 secured to its upper end by screw 45. A threaded shaft 46 passes through block 44 and extends downward along the axis of extensible mounting post 43 and screws into block 74. A knob 47 and a collar 48 are secured to threaded shaft 46 on either immediate side of block 44 so that mounting post 43 follows threaded shaft 46 in linear motion with respect to upright member 42 when knob 47 is rotated.

As shown in FIGS. 2 and 3, support brackets 50 are secured to mounting post 43 by means of screws 52. Mounting bracket 55 shown in FIGS. 3 and 8 is a plate with a plurality of holes arrayed in a pattern which provides compensation for any orientation of mounting holes in the object to be attached, and is secured to the support bracket 50 by means of screws 54.

As shown in FIGS. 2 and 7, mounting bracket 57 is a flanged circular plate, having a series of slots in its face, attached to the mounting post 43 by bolt 53 and spacer 51. Additional support for bracket 57 is provided by clamp piece 58, attached to support bracket 50 by screws 59, which clamps the flange of bracket 57 to bracket 50. As can be seen in FIG. 14, bracket 57 may be rotated to compensate for any inclination of the mounting post 43.

A third type of mounting bracket 60 is shown in FIG. 2 and comprises a plate 61 hinged to a bracket 62 which is secured to post 43 by support bracket 50 and bolt 53 with spacer 51. Plate 61 is further supported by threaded rod 63, the upper end of which fits into bracket 64 attached to plate 61, and the lower end of which passes through a hole in member 65 which is secured to bracket 62 by screw 66. As seen in FIG. 14, the inclination of plate 61 with respect to mounting post 43 is adjusted by means of nuts 67 and 68 disposed on threaded rod 63 both above and below member 65.

Another type of mounting bracket is shown in FIGS. 9 and 11 and comprises a pan 69 secured to post 43 by bracket 70, and having a lip 71 which overlaps the edge of tray 72 which is slidably inserted into pan 69.

FIGS. 15 and 16 show an auxiliary clamp 80 comprising a bracket 77 adjustably secured to mounting plate 29 of leg 28 by thumb screws 78. Clamping member 80a, secured to bracket 77 by spacer 79 and screws 81, engages the underside of a desk top having a narrow ledge or weak lip, to strengthen it against the workload. If used, auxiliary clamp 80 must be used in conjunction with telescoping arm members 30. On some desks auxiliary clamp 80 can be useful in preventing rotation of horizontal member 25, especially when it is not securely attached.

FIGS. 17 and 18 show another type of auxiliary clamp 83 which is not necessarily used in conjunction with telescoping arm members 30. Auxiliary clamp 83 comprises a channel member 86, a jack screw 85, and an L-shaped bracket 83a secured to mounting plate 29 by screws 84. Auxiliary clamp 83 is especially designed to engage desk bottoms not flat and smooth. Gripping the neck of jack screw 85 is spring clip 87 which holds it in channel member 86. In turning jack screw 85, the surface of channel member 86 is forced to engage the irregular undersurface of a desk, thus locking firmly despite the irregularity. Also, auxiliary clamp 83 is used on a desk when the back of its top has been built adjacent a wall.

I claim:

1. A mounting assembly for holding desk supplies at a desired elevated position above a desk and comprising a desk gripper having independently extensible arm members with adjustable clamping brackets attached to the ends thereof to grip opposing edges of the desk top, an upright telescoping mounting post attached to the desk gripper and having screw means for adjusting the extension of the post above the desk gripper to position the desk supplies to be held at the desired height above the desk, supporting brackets attached to the upper end of the extensible mounting post, and mounting brackets attached to said supporting brackets, for holding the desk supplies.

2. A mounting assembly as defined in claim 1 wherein at least one mounting bracket is vertically rotatable to provide for mounting of the desk supplies at any angle.

3. A mounting assembly as defined in claim 2 including clamping means to hold the bracket at the desired degree of rotation and to laterally support the bracket.

4. A mounting assembly as defined in claim 1 wherein at least one mounting bracket has an adjustable shelf-like platform which can be leveled when the extensible mounting post is inclined.

5. A mounting assembly as defined in claim 4 further comprising a supporting member secured to the supporting bracket, and a threaded rod extending from the supporting member, which extension is adjustable by means of nuts disposed on said threaded rod on either immediate adjacent side of the supporting member, wherein one end of the adjustable shelf platform is hinged to the supporting member, and the other end is supported by the threaded rod.

6. A desk gripper as defined in claim 5 including an auxiliary clamp attached to the downward leg member which engages the underside of the desk top at the end of the desk.

7. A mounting assembly as defined in claim 1 wherein at least one mounting bracket includes an open-ended, pan-shaped member having lipped edges, and a tray-shaped member slidably inserted into the open end of said pan-shaped member.

8. A mounting assembly as defined in claim 1 wherein at least one mounting bracket comprises a plate having a plurality of holes.

9. A desk gripper for attaching a mounting assembly to a desk and comprising a horizontal member having one leg element that extends downward to engage the end of the desk and a second leg element that extends outward to engage the top of the desk, said second leg element including adjustment means for use on an irregular surface, independently telescoping members extending from opposite ends of the horizontal member, and clamps attached to the telescoping members by end brackets and adjustable to engage the underside of the desk top, and screw means for independently adjusting extension of the telescoping members from the horizontal member to position the end brackets at the front and back of the desk.

10. A desk gripper as defined in claim 9 including an auxiliary clamp attached to the downward leg and comprising a depending angle bracket which extends underneath the desk top and has a jack screw which engages the undersurface of the desk top.

11. A desk gripper as defined in claim 10 wherein the jack screw has a channel member associated with it for use on an irregular undersurface.

12. A mounting assembly for holding objects at a desired position with respect to a desk top and comprising, clamping means, said clamping means including two arm members for attaching the assembly to the desk by gripping the outside edges of the desk, first extending means for extending one arm member independently of the other arm member, and second extending means for extending the other arm member independently of said one arm member whereby the clamping means can be located at any lateral position with respect to the desk top, extensible supporting means for supporting the objects above the desk, securing means for attaching the objects to said supporting means, and compensating means associated with the clamping means and adjustable to compensate for surface irregularities of the desk top surface.

13. A mounting assembly for holding desk supplies at a desired elevated position with respect to the desk top and comprising, a desk gripper for attaching the assembly to a desk, said desk gripping including two arm members for attaching the assembly to the desk by gripping the outside edges of the desk, first extending means for extending one arm member independently of the other arm member, and second extending means for extending the other arm member independently of said one arm member whereby the desk gripper can be located at any lateral position with respect to the desk top, a telescoping mounting post rigidly attached to the desk gripper, supporting brackets attached to the telescoping mounting posts, and mounting brackets attached to the supporting brackets.

References Cited
UNITED STATES PATENTS

| 759,924 | 5/1904 | Smith. | |
| 1,420,676 | 6/1922 | Angell | 108—28 X |
| 2,243,517 | 5/1941 | Adamson | 248—226 X |
| 2,271,616 | 2/1942 | Beale | 248—226 X |
| 2,827,176 | 3/1958 | Ready | 108—28 |
| 2,954,955 | 10/1960 | Feller | 248—226 |
| 3,238,925 | 3/1966 | Swett | 248—226 X |
| 3,315,932 | 4/1967 | Chandler | 248—226 |

MARVIN A. CHAMPION, Primary Examiner

I. A. CALVERT, Assistant Examiner

U.S. Cl. X.R.

108—152; 248—226